United States Patent [19]

Goganov et al.

[11] Patent Number: 4,510,391
[45] Date of Patent: Apr. 9, 1985

[54] GAS-DISCHARGE POSITION-SENSITIVE IONIZING-RADIATION DETECTOR

[75] Inventors: Dmitry A. Goganov; Evgeny K. Ovchinnikov, both of Leningrad, U.S.S.R.

[73] Assignee: NPO "Burevestnik", Leningrad, U.S.S.R.

[21] Appl. No.: 459,971

[22] Filed: Jan. 21, 1983

[51] Int. Cl.³ .............................................. G01T 1/185
[52] U.S. Cl. .................................................. 250/374
[58] Field of Search ............... 250/381, 374, 387, 386; 313/93

[56] References Cited

U.S. PATENT DOCUMENTS

| | | | |
|---|---|---|---|
| 3,246,154 | 4/1966 | Harrison | 250/387 |
| 3,400,268 | 9/1968 | Amano | 250/387 |
| 3,483,377 | 12/1969 | Borkowski et al. | 250/374 |
| 4,149,109 | 4/1979 | Kreutz et al. | 315/58 |

Primary Examiner—Janice A. Howell
Assistant Examiner—Constantine Hannaher
Attorney, Agent, or Firm—Ladas & Parry

[57] ABSTRACT

A gas-discharge position-sensitive ionizing-radiation detector comprising an anode electrode mounted inside a housing and including a threadlike substrate coated with a layer of resistive material which receives electric charges created by ionization of gas in the housing under the influence of ionizing radiation. The end portions of said resistive layer are connected to electric leads of the detector. The detector further comprises a shunting resistive element connected in parallel with said layer of resistive material.

4 Claims, 7 Drawing Figures

GAS-DISCHARGE POSITION-SENSITIVE IONIZING-RADIATION DETECTOR

FIELD OF THE INVENTION

The present invention relates to devices used for determining the spatial position of ionizing radiation, and more particularly to gas-discharge position-sensitive ionizing-radiation detectors.

The present invention can be used in X-ray small-angle diffractometers, in organic and non-organic material microstructure analysing devices including those for studying variations in microstructure with time, in residual stress measuring devices, etc.

BACKGROUND OF THE INVENTION

A gas-discharge position-sensitive ionizing-radiation detector is a device comprising an electrode mounted inside a housing filled with inert gas and provided with a window for passing ionizing radiation. A high voltage is applied between the housing and the electrode, which has a positive potential in relation to the housing and thus represents an anode electrode. During operation, the anode electrode is connected to an electric circuit responding to the electric pulse produced by electric charges collected on the anode electrode as a result of ionization of gas in the housing under the influence of ionizing radiation.

The spatial position of ionizing radiation is preferably determined by measuring the rise time of the voltage pulse at an end of the anode electrode, which pulse is amplified by the electric circuit. The rise time of said pulse increases with increase in the distance between the end of the electrode and that point on the electrode at which electric charges created by ionization of gas are collected. This is due to the fact that an increase in said distance is followed by an increase in the charge time of the equivalent capacitance constituted by the distributed capacitance between the anode electrode and the housing, the capacitance of the electrode end holder, the capacitance of the electric lead, and the input capacitance of the electric measuring circuit.

In detectors operating on this principle, the anode electrode is usually formed by a threadlike substrate coated with a layer of resistive material which receives electric charges created by ionization of gas in the housing. The resistive material of the layer has a high resistance usually constituting from several thousands to several tens of thousands ohms per a millimeter of the electrode length.

For example, U.S. Pat. No. 3,483,377 describes a gas-discharge position-sensitive ionizing-radiation detector, in which the anode electrode includes a threadlike substrate of insulating material coated with a layer of resistive material having a high resistance. The portion of the resistive layer adjacent one of its ends is electrically connected to an electric lead attached to the housing to provide connection to the input of an electric circuit responding to the rise time of the voltage pulse produced upon ionization at the resistive layer end portion connected to the electric lead.

With such a detector, the relationship between the distance to the point at the electrode where charges created by ionizing radiation are collected and the rise time of the pulse at the end of the electrode substantially differs from proportional relationship, i.e. represents a nonlinear function. This nonlinearity can be explained by the presence of an exponential component in the time response characterizing the charging of the equivalent capacitance by the electric pulse appearing at the point where electric charges are collected. Because of this exponential component, the same amount of change in the position of the charge-collecting point causes the rise time of the pulse at an end of the electrode to change by a value which is the greater, the greater is the distance between the charge-collecting point and this end of the electrode. In other words, the greater the distance, the quicker variation of the time rise caused by variation in the position of the charge-collecting point.

Such a nonlinearity of the detector characteristic leads to decrease in the accuracy to which the position of the charge-collecting point is determined, and thus in the accuracy to which the spatial distribution of the ionizing radiation from an object is registered.

It is possible to reduce the error caused by the nonlinearity of the detector by introducing corresponding corrections into the measurement results, i.e. by suitably processing the signal in the measuring circuit. Such signal processing, however, is rather complicated and requires a specialized computing device, the presence of which greatly increases the complexity of the measuring equipment. Besides, the process of measurement of the detector nonlinearity is very labour-consuming because the measurements must be made to a high degree of accuracy and repeated many times to obtain statistically valid results. Moreover, the nonlinearity of the detector characteristic does not remain constant but varies with time due to ageing of the resistive material and to variation in the environmental conditions.

A reduction in the nonlinearity can be provided by measuring the difference between the rise times of the voltage pulses at the opposite ends of the anode electrode, as described, for example, in U.S. Pat. No. 4,149,109. This patent describes a gas-discharge position-sensitive ionizing-radiation detector comprising a gas-tight gas-filled housing, and an anode electrode mounted inside the housing and including a threadlike substrate of insulating material coated with a layer of resistive material having a high resistance and receiving electric charges created by ionization of gas in the housing under the influence of ionizing radiation, the end portions of said resistive layer being connected to two electric leads attached to the housing to provide connections to the inputs of an electric measuring circuit responding to the difference between the rise times of the voltage pulses produced at the opposite ends of the anode electrode upon ionization of gas in the housing.

The improvement in linearity in this case results from the fact that an increase in the distance between one of the electrode ends and the charge-collecting point leads not only to a more rapid increase in the rise time of the pulse at this end of the electrode but also to a slower reduction in the rise time of the pulse at the opposite end of the electrode. Therefore the difference between the rise times of the pulses at the opposite ends of the electrode is more linear with the coordinate of the charge-collecting point, because a quicker increase in the rise time at one of the electrode ends is partially compensated for by a slower reduction in the rise time at the other end.

As the distance between the charge-collecting point and one of the electrode ends is incresed, the rise time of the pulse at this end, as long as it remains closer to the charge-collecting point than the other end, increases slower than decreases the rise time of the pulse at the other end. When the charge-collecting point is equally spaced from the electrode ends, the rise times of the pulses at these ends are also equal and their variation with variation in the coordinate of the charge-collecting point proceeds at this instant at the same rate. Upon further increase in the distance between the charge-collecting point and the first end of the electrode, i.e. when the other end of the electrode becomes the nearest to the charge-collecting point, the increase in the rise time of the pulse at the first end will proceed more rapidly than the decrease in the rise time of the pulse at the other end. Thus, the rate of variation of the difference between the rise times of the pulses at the electrode ends does not remain constant with variation in the coordinate of the charge-collecting point. Therefore in this case, too, the detector characteristic remains considerably nonlinear, which causes reduction in the accuracy to which the spatial distribution of ionizing radiation can be registered.

SUMMARY OF THE INVENTION

It is an object of the present invention to provide a gas-discharge position-sensitive ionizing-radiation detector which makes it possible to register the spatial distribution of ionizing radiation to a higher degree of accuracy.

It is another object of the present invention to provide a gas-discharge position-sensitive ionizing-radiation detector which has an improved linearity.

It is still another object of the present invention to provide a gas-discharge position-sensitive ionizing-radiation detector which ensures a more linear relationship between the coordinate of that point on the anode electrode at which electric charges created by ionization of gas in the detector under the influence of ionizing radiation are collected and the difference between the rise times of the voltage pulses appearing at the ends of the electrode.

With these and other objects in view there is proposed a gas-discharge position-sensitive ionizing-radiation detector comprising a gas-tight gas-filled housing, and an anode electrode mounting inside the housing and including a thread-like substrate and a layer of resistive material extending along the substrate and receiving electric charges created by ionization of gas in the housing under the influence of ionizing radiation, said layer of resistive material having its end portions connected to electric leads attached to the housing. According to the invention, the detector further comprises a shunting resistive element connected in parallel with the layer of resistive material receiving electric charges created by ionization of gas in the houssing, said resistive element having a resistance greater than or equal to one third of the resistance between the end portions of said layer of resistive material.

The presence of the shunting resistive element provides a more linear relationship between the coordinate of that point on the anode electrode at which electric charges created by ionization of gas in the housing are collected and the difference between the rise times of the pulses appearing at the ends of the electrode, i.e., a more linear characteristic of the detector. As a result, the spatial distribution of ionizing radiation can be measured to a higher degree of accuracy.

According to one embodiment of the invention, the shunting resistive element represents a resistor having its leads respectively connected to said electric leads attached to the housing.

According to another embodiment of the invention, the shunting resistive element is formed by a layer of resistive material disposed in the longitudinal direction on the substrate of the anode electrode and coated with a layer of insulating material, while the layer of resistive material receiving electric charges created by ionization on the layer of insulating material and has its end portions electrically connected, respectively, to the end portions of the layer forming the shunting resistive element, the resistance between the end portions of the layer forming the shunting element being greater than or equal to one-third of the resistance between the end portions of the layer receiving electric charges created by ionization of gas in the housing.

According to still another embodiment of the invention, the shunting resistive element is formed by a filament of resistive material passing in the longitudinal direction inside the substrate of the anode electrode and having its ends electrically connected, respectively, to the end portions of the layer receiving electric charges created by ionization of gas in the housing, the resistance between the ends of the filament being greater than or equal to one-third of the resistance between the end portions of the layer receiving electric charges created by ionization of gas in the housing.

The aforementioned and other objects and advantages of the present invention will become more apparent upon consideration of the following detailed description of the preferred embodiments taken in conjunction with the accompanying drawings.

DETAILED DESCRIPTION OF THE INVENTION

Figure 1:
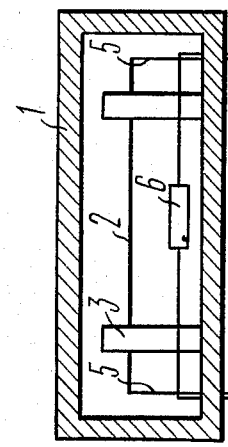
FIG. 1 is a sectional side view of a gas-discharge position-sensitive ionizing-radiation detector, according to one embodiment of the invention.

Referring to FIG. 1, the gas-discharge position-sensitive ionizing-radiation detector comprises a gas-tight housing 1 filled with inert gas and having a window (not shown) for passing ionizing radiation, and an anode electrode 2 mounted inside the housing 1 and including a thread-like substrate coated with a layer of resistive material disposed on the substrate in the longitudinal direction. The resistive material is strictly homogeneous in composition and uniform in thickness along the length of the resistive layer and has a high electric resistance constituting, for example, from several thousands to several tens of thousands ohms per a millimeter of the electrode length.

The anode electrode 2 may represent a quartz fiber with pyrolytic carbon coating.

The end portions of the resistive layer are coated with silver and fitted into copper sleeves (not shown) secured in post 3 attached to the wall of the housing 1.

The detector is provided with two electric leads attached to the housing 1 and insulated therefrom. Each end portion of the resistive layer on the substrate of the anode electrode 2 is electrically connected to the inner end of a corresponding electric lead 4 by means of a wire 5 having one end soldered to the copper sleeves secured in the post 3 and another end soldered to the lead 4. The other end of each of the leads 4 extends outwardly from the housing 1 and provides connection to an electric circuit (not shown) arranged to measure the difference between the rise times of the voltage pulses at the ends of the anode electrode 2 (i.e. at the end portions of the resistive layer), which pulses are produced as a result of ionization of gas in the housing 1 under the influence of ionizing radiation.

One of the inputs of the electric measuring circuit is to be connected between one of the leads 4 and the housing 1, while another input of the electric circuit is to be connected between the other lead 4 and the housing 1.

The anode electrode 2 and the housing 1 are respectively connected to the terminals of a high-voltage supply (not shown).

The detector further comprises a shunting resistive element connected in parallel with the resistive layer of the anode electrode 2 and constituted by a resistor 6 mounted inside the housing 1 and having its leads respectively soldered to the inner ends of the leads 4.

It is also possible to install the resistor on the outside of the housing 1.

Figure 2:
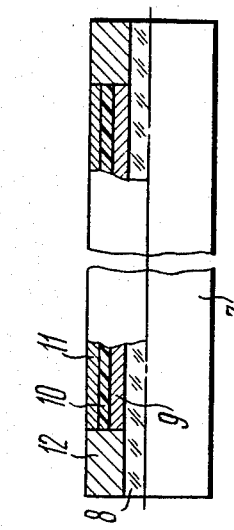
FIG. 2 is a sectional view of the anode electrode of a gas-discharge position-sensitive ionizing-radiation detector, according to another embodiment of the invention.

According to another embodiment of the invention, the resistor connected between the leads of the detector is substituted by a shunting resistive element formed by a layer of resistive material, as shown in FIG. 2.

Referring to FIG. 2, an anode electrode 7 includes a thread-like substrate 8, e.g. made of glass, coated with a layer 9 of resistive material having a high electric resistance. The resistive layer 9 is coated with a layer 10 of insulating material, which, in turn, is coated with a layer 11 of resistive material homogeneous in composition and uniform in thickness along the electrode length and having a high electric resistance. The surface of the layer 11 forms the surface of the anode electrode 7. Each of the end portions of the electrode 2 is coated with a layer 12 of conductive material, e.g. deposited by spraying. Each of the conductive layers 12 is in electrical contact with the adjacent end portions of the layers 9 and 11.

Thus, the layer 11 is insulated along its length from the layer 9 with the exception of the end portions of the layer 11 which are electrically connected to the end portions of the layer 9 at each end of the electrode 2, i.e. the layer 11 forms a shunting resistive element connected in parallel with the layer 9.

The anode electrode 7 is mounted in the posts placed inside the housing of the detector and the layers 12 of conductive material are connected to the detector leads in the same fashion as described with reference to FIG. 1.

Figure 3:
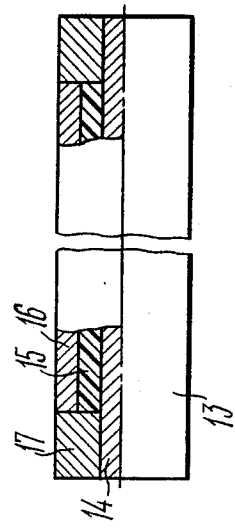
FIG. 3 is a sectional view of the anode electrode of a gas-discharge position-sensitive ionizing-radiation detector, according to still another embodiment of the invention.

According to still another embodiment of the invention, the shunting resistive element is formed by a filament of resistive material passing inside the substrate of the anode electrode, as shown in FIG. 3.

Referring to FIG. 3, an anode electrode 13 includes a filament 14 made of resistive material having a high electric resistance and coated with a layer 15 of insulating material forming the substrate of the anode electrode 13. The layer 15 is coated with a layer 16 of resistive material which is homogeneous in composition and uniform in thickness and has a high electric resistance. The surface of the layer 16 forms the surface of the anode electrode 13. Each end of the filament 14 is coated with a layer 17 of conductive material which is in electric contact with the adjacent end portion of the resistive layer 16.

Thus, the filament 14 is insulated along its length from the layer 16 except for the end portions of the filament 14 which are electrically connected to the end portions of the layer 16 at each end of the electrode 13, i.e. the filament 14 forms a shunting resistive element connected in parallel with the layer 16.

The anode electrode 13 is mounted in the posts placed inside the housing of the detector and the layers 17 of conductive material are connected to the detector leads in the same fashion as described with reference to FIG. 1.

The detector operates as follows.

The beam of ionizing radiation is directed inside the housing 1 (FIG. 1) approximately at a right angle to the anode electrode 2. On entering the housing 1, the beam of ionizing radiation produces ionization of gas in the housing 1 at the points along the line of travel of the radiation beam. Because of the potential difference between the electrode 2 and the housing 1, electric charges created by ionization of gas are collected at a point of the resistive layer on the surface of the electrode 2, viz, at the point of intersection of the anode electrode with the plane passing through the radiation beam at a right angle to the anode electrode. Accumulation of charges at the electrode 2 produces voltage pulses at its ends which pulses are passed via the leads 4 to the inputs of the electric measuring circuit.

The rise time of the pulse at an end of the electrode 2 is determined by the time constant of the charging circuit of the equivalent capacitance constituted by the distributed capacitance between the housing 1 and the portion of the resistive layer on the surface of the electrode 2 located between this end of the electrode 2 and the charge-collecting point, the capacitance of the electrode end holder, the capacitance of the electric lead, and the input capacitance of the electric circuit. This time constant is, in turn, determined by the resistance of said portion of the resistive layer on the electrode surface between the end of the electrode 2 and the charge-collecting point.

The difference between the rise time of the pulse at one end of the anode electrode and the rise time of the pulse at the other end thereof is measured by the electric measuring circuit.

During operation of the detector with the shunting resistive element formed by a layer of resistive material, as shown in FIG. 2, electric charges created by ionization of gas are collected at a corresponding point of the resistive layer 11 on the surface of the electrode 7, and the pulses produced at the end portions of the layer 11 pass via the conductive layers 12 and the detector leads to the inputs of the electric measuring circuit. During operation of the detector with the shunting element formed by a filament of resistive material, as shown in FIG. 3, electric charges are collected at a corresponding point of the resistive layer 16 on the surface of the anode electrode 13, and the pulses produced at the end portions of the layer 16 pass to the inputs of the electric circuit via the detector leads and the conductive layers 17.

Figure 4:
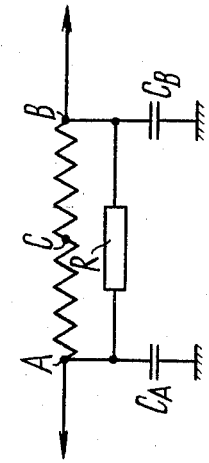
FIG. 4 is an equivalent circuit illustrating the process of generation of voltage pulses at the ends of the anode electrode.

The process of generation of pulses at the ends of the anode electrode is illustrated by an equivalent circuit shown in FIG. 4. The points A and B correspond to the end portions of the resistive layer on the surface of the anode electrode 2 (FIG. 1), resistive layer 11 of the anode electrode 7 (FIG. 2), and the resistive layer 16 of the anode electrode 13 (FIG. 3), the point C corresponds to the midpoint of the resistive layer on the surface of the anode electrode, and the capacitors $C_A$ and $C_B$ correspond to the equivalent capacitances connected to the end portions of the resistive layer on the surface of the anode electrode. The resistance R corresponds to the resistance of the shunting resistive element connected in parallel with the resistive layer on the surface of the anode electrode, i.e. to the resistance of the resistor 6 in FIG. 1, the resistance between the end portions of the resistive layer 9 in FIG. 2, and the resistance between the ends of the filament 14 in FIG. 3.

The process of generation of pulses at the points A and B (FIG. 4) is first considered without taking into account the influence of the resistance R of the shunting element.

If the charges created by ionization of gas under the influence of ionizing radiation are collected at the point A, the rise time $t_A$ of the pulse at the point A is zero, the rise time $t_B$ of the pulse at the point B has a maximum value, and the difference $\Delta t = t_B - t_A$ between the rise time of the pulse at the point B and the rise time of the pulse at the point A has a maximum positive value. As the distance between the point A and the point at which electric charges are collected increases, the time $t_A$ becomes greater, whereas the time $t_B$ becomes smaller, so that the difference $\Delta t$ decreases with increase in said distance. If the charges are collected at the point C, $\Delta t = 0$; if the charges are collected at the point B, $\Delta t$ has a maximum negative value.

Figure 5A:
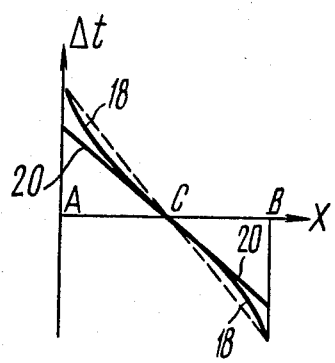
FIGS. 5a and 5b are graphs showing the characteristics of the known detector and the detector of the present invention.

If the charging curve of the capacitors $C_A$ and $C_B$ represented a linear function of time, the detector characteristic would be a straight line corresponding to the dashed line in FIG. 5a, wherein the distance "x" between the charge-collecting point and the point A is plotted along the horizontal axis and the difference $\Delta t$ is plotted along the vertical axis. However, as is well known, a capacitor is charged according to an exponential curve, as a result of which the rise time of the voltage across a capacitor varies not proportionally with variation of the resistance in the charging circuit but the quicker, the greater is the value of this resistance. Therefore, as the distance between the charge-collecting point and the point A increases, the rise time of the pulse at the point A (in the absence of the shunting resistance R) increases within the portion AC slower, and within the portion BC quicker than decreases the rise time of the pulse at the point B, with the result that the value of $\Delta t$ changes more rapidly when the charge-collecting point is near the point A or B and slower when the charge-collecting point is near the point C. Thus, the detector characteristic, i.e. the relationship between the coordinate of the charge-collecting point, which defines the spatial position of the beam of ionizing radiation, and the difference between the rise times of the pulses at the ends of the anode electrode, in this case will have a shape corresponding to the curve 18 in FIG. 5a, i.e. will be substantially nonlinear.

Figure 5B:
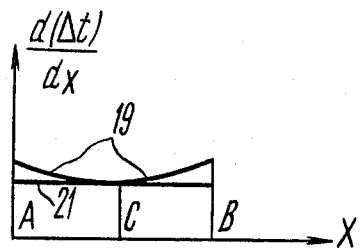

The differential characteristic will correspond in this case to the curve 19 in FIG. 5b.

In the presence of the shunting resistance R (FIG. 4), the generation of voltage pulses at the points A and B proceeds as follows.

If the charges created by ionization of gas in the detector are collected at a point lying within the portion $A^C$, the capacitance $C_B$ is additionally charged via the resistance R by the voltage at the point A because this voltage grows more rapidly than the voltage at the point B. As a result, in such a case the voltage at the point A grows slower and at the point B quicker than in the absence of the shunting resistance, the influence of the resistance R on the rise times of the pulses at the points A and B growing less as the distance between the point A and the charge-collecting point increases. If the charges are collected at the point C, the resistance R has no effect on the generation of pulses at the points A and B because in such a case the voltages at the points A and B grow at the same rate.

Thus, the employment of the shunting resistance R leads to reduction in the rate at which the value of $\Delta t$ varies with variation of the coordinate "x" between the points A and C and between the points B and C, said reduction in the rate of variation of $\Delta t$ being the greater, the smaller is the distance between the charge-collecting point and the nearest end of the anode electrode (the nearest of the points A,B), and the smaller is the resistance R. By properly choosing the value of the resistance R, it is possible to achieve such a reduction in the rate of variation of $\Delta t$ at the ends of the detector characteristic, that this characteristic will take a shape close to the straight line 20 in FIG. 5a. The differential characteristic of the detector will correspond in this case to the horizontal line 21 (FIG. 5b).

Figure 6:
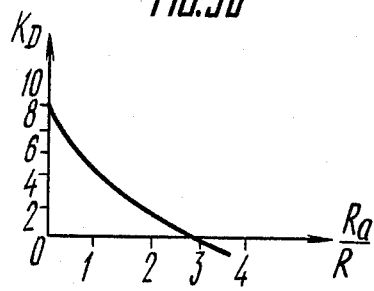
FIG. 6 is a graph showing how the detector nonlinearity depends on the resistance of the shunting element connected in parallel with the resistive layer on the surface of the anode electrode.

The influence of the resistance R on the linearity of the detector characteristic is illustrated by the curve of FIG. 6, where the ratio of the resistance $R_a$ between the end portions of the resistive layer on the surface of the anode electrode to the resistance R of the shunting resistive element is plotted along the horizontal axis and the differential nonlinearity factor $K_D$ of the detector (in percent) is plotted along the vertical axis. The curve of FIG. 6 was obtained by experiment for a detector with an anode electrode having the length of the working region constituting 50 mm and the resistance of the surface resistive layer constituting 80 kohm in one case and 160 kohm in another case. As can be seen from the curve of FIG. 6, the shunting resistance R equal to one half of the resistance $R_a$ between the end portions of the resistive layer on the surface of the anode electrode provided reduction in the differential nonlinearity from 10% to 2%. In such a case practically no reduction in the spatial resolution of the detector was observed. Further reduction in the shunting resistance to a value at which $R_a/R = 3$ brought the nonlinearity to zero but, at the same time, caused a substantial reduction in the spatial resolution (from 120 micrometers at $R_a/R = 2$ to 180 micrometers at $R_a/R = 3$). As the shunting resistance was further reduced below the value at which $R_a/R = 3$, the nonlinearity began to increase, while the spatial resolution deteriorated at the same time. Thus, it is expedient to use a shunting resistance which has a value not less than one-third of the resistance between the end portions of the resistive layer of the surface of the anode electrode.

While the invention is described herein in the terms of the preferred embodiments, numerous modifications may be made without departure from the spirit and scope of the invention as defined in the appended claims.

We claim:

1. A gas-discharge position-sensitive ionizing-radiation detector comprising:
   a gas-tight gas-filled housing;
   an anode electrode mounted inside said housing and including a threadlike substrate of insulating material and a layer of resistive material extending along said substrate and receiving electric charges created by ionization of gas in said housing under the influence of the ionizing radiation to be detected, said layer of resistive material having two end portions;
   two electric leads attached to said housing and respectively connected to said end portions of said layer of resistive material;
   a shunting resistive element connected in parallel with said layer of resistive material, the resistance of said shunting resistive element being greater than or equal to one third of the resistance between said end portions of said layer of resistive material.

2. A gas-discharge position-sensitive ionizing-radiation detector according to claim 1, wherein said shunting resistive element is a resistor having two leads respectively connected to said end portions of said layer of resistive material.

3. A gas-discharge position-sensitive ionizing-radiation detector, according to claim 1, wherein:
   said shunting resistive element is formed by a layer of resistive material disposed in the longitudinal direction on said substrate of said anode electrode and having two end portions and a coating formed by a layer of insulating material; and
   said layer of resistive material receiving electric charges created by ionization of gas in said housing is disposed in the longitudinal direction on said layer of insulating material, said end portions of said layer of resistive material receiving electric charges being electrically connected, respectively, to said end portions of said layer forming said shunting resistive element, the resistance between said end portions of said layer forming said shunting resistive element being greater than or equal to one-third of the resistance between said end portions of said layer receiving electric charges created by ionization of gas in said housing.

4. A gas-discharge position-sensitive ionizing-radiation detector according to claim 1, wherein said shunting resistive element is formed by a filament of resistive material passing inside said substrate of said anode electrode in the longitudinal direction and having its ends electrically connected, respectively, to said end portions of said layer receiving electric charges created by ionization of gas in said housing, the resistance between said ends of said filament being greater than or equal to one-third of the resistance between said end portions of said layer receiving electric charges created by ionization of gas in said housing.

* * * * *